United States Patent [19]

Dolderer

[11] Patent Number: 4,465,052

[45] Date of Patent: Aug. 14, 1984

[54] METERING DEVICE FOR GASEOUS PROPELLANT

[75] Inventor: Erich A. Dolderer, Mössingen, Fed. Rep. of Germany

[73] Assignee: Karl Hopt GmbH, Fed. Rep. of Germany

[21] Appl. No.: 400,418

[22] Filed: Jul. 21, 1982

[30] Foreign Application Priority Data

Jul. 24, 1981 [DE] Fed. Rep. of Germany ....... 3129191

[51] Int. Cl.³ ............................................ F02M 21/04
[52] U.S. Cl. ..................................... 123/527; 123/575; 123/577; 123/27 GE; 48/180 C; 239/410
[58] Field of Search ............... 123/575, 576, 577, 578, 123/27 GE, 527, 337, 590; 48/180 R, 180 C; 239/410, 412, 414, 416.4

[56] References Cited

U.S. PATENT DOCUMENTS

| 4,147,183 | 4/1979 | Kalsi | 137/625.28 |
| 4,399,795 | 8/1983 | Brown | 123/27 GE |

FOREIGN PATENT DOCUMENTS

| 1299932 | 9/1969 | Fed. Rep. of Germany . |
| 2260059 | 6/1974 | Fed. Rep. of Germany . |
| 2837692 | 7/1979 | Fed. Rep. of Germany . |
| 2311972 | 12/1976 | France . |
| 1479588 | 7/1977 | United Kingdom . |

OTHER PUBLICATIONS

Bickley, "New Products . . . Automotive-Aviation", *Automotive Industries*, May 15, 1967, pp. 111 and 117.

Primary Examiner—Craig R. Feinberg
Assistant Examiner—David A. Okonskey
Attorney, Agent, or Firm—Fitch, Even, Tabin & Flannery

[57] ABSTRACT

The invention relates to a metering device for gaseous propellant for internal combustion engines. The invention resides in the device comprising a slit means (40) through which the gas flows, and a means (45, 47, 49 or 45, 47, 68, respectively) for covering at least one slit (42, 53) in dependence upon another flowing medium (28), for example, the air quantity taken in by an internal combustion engine, said means comprising a foil (47) pressed against the slit edges and rigidly secured at its end adjacent one end of the slits (42, 53) to said slit means (40), with a member (49, 68, respectively) which counteracts the bearing pressure engaging the other portion of said foil located adjacent the other slit end, further comprising in the area of the slits (42, 53) a member (45) which acts in the same direction as the bearing pressure, causes the foil (47) to bear against the slit edges and is displaceable in dependence upon the flow of the other medium (28) along the slits (42, 53).

20 Claims, 4 Drawing Figures

METERING DEVICE FOR GASEOUS PROPELLANT

The invention relates to a metering device for gaseous propellant for internal combustion engines.

Metering devices for propellant gases are subject to special conditions which are partly very different from those to which metering devices for liquid fuels are subjected. For example, the temperature of a propellant gas which has previously been in the liquid state is approximately 5° C. in the metering device. However, in the event of faults in the preheating stage, lower temperatures of, for example, up to $-40°$ C. may also occur. The metering device should at least be still somewhat capable of functioning. Furthermore, gas which has been subjected to heating in the liquid state does not contain any more liquid components, whereas liquid fuel still contains so many liquid constituents even in the carburetor that a lubricating effect is obtained which prevents seizure of parts which are movable relative to one another. As Spausta states in his book "Fuels For Internal Combustion Engines", Volume II: "Slides which, for example, are controlled by the accelerator pedal are not suitable for metering gaseous propellants. Slides should always be kept lubricated, but if gaseous fuel were used the lubricant would be removed by the gas, thus causing immediate dry operation, which would result in increased friction and wear and tear.

Known metering devices for gaseous propellants are controlled by the vacuum in the carburetor. The gaseous substance is supplied through the carburetor. However, such devices require conversions to the carburetor, which are not permitted in many countries. Furthermore, the known metering devices for gaseous propellants have the disadvantage that a carburetor for liquid fuels which has been converted for this purpose no longer functions properly. In practice, however, the change over from liquid fuel to gaseous fuel should be as quick and simple as possible.

The known metering devices for gaseous propellants have the further disadvantage that it is hardly possible to maintain a constant proportion of gas to air throughout the entire output range of the engine. This results in the gas consumption being too high, the acceleration being worse than with an engine driven on liquid fuel, and in a decrease in the output in the upper speed range. If, however, the gas supply is properly metered there is no need for an internal combustion engine driven with gaseous propellant to display a drop in output compared with an internal combustion engine driven on liquid fuel, provided the gaseous fuel is metered by suitable means in relation to the combustion air.

The provision of longitudinal slits in a cylindrically shaped pipe section which depending upon requirement are opened partly or fully by a piston shaped slide to meter liquid fuel is already known. However, this metering device which was manufactured by the German company Bosch, cannot be used for metering propollant gas because of the use of a slide and the disadvantages and risks involved therein.

The object underlying the invention is to provide a metering device which is specially suited for an internal combustion engine driven on liquefied petroleum gas, for example, a mixture of propane and butane, and which eliminates the need for a slide.

This object is attained in accordance with the invention in that the metering device comprises a slit means through which the gas flows, and a means for partially, if required, covering the slits in dependence upon another flowing medium, for example, the air quantity taken in by an internal combustion engine, said means comprising a foil pressed against the slit edges and rigidly secured at its end adjacent one end of the slits to said slit means, with a member which counteracts the bearing pressure engaging the other portion of said foil located adjacent the other slit end, further comprising in the area of the slits a member which acts in the same direction as the bearing pressure, causes the foil to bear against the slit edges and is displaceable in dependence upon the flow of the other medium along the slits.

The invention has the advantage that it is readily possible to maintain a constant proportion of gas to air throughout the entire output range of the engine, and that the composition of the gas/air mixture can be precisely adapted to the engine characteristic throughout the entire output and speed range including acceleration. A special advantage of the invention is that this metering device operates without any lubrication whatever, and that its mechanical friction is reduced to a minimun so that the driving power required for this metering device is likewise very low, namely under 2 bar. This also enables direct actuation of the metering device, without use of a lever system, by a measuring disc which is positioned in the other flowing medium, for example, in the air stream taken in by the internal combustion engine.

Such drive means for metering devices operating in dependence upon the quantity of medium flowing per unit of time are known. The air or gas is conducted through a pipe which is slightly conical and contains a suspended body, which in dependence upon the amount of medium flowing through is more or less raised against gravity or a resilient force. It is also known to replace the suspended body by a measuring disc which may move freely in a measuring nozzle and whose position likewise corresponds to the quantity of medium flowing through. In a metering device for liquid fuel disclosed in German Offenlegungsschrift No. 19 60 146, the measuring disc is secured to the long arm of a lever means mounted for slight rotation. The short lever than actuates the metering device. With the metering device according to the invention, such low friction values are obtainable that there is no need for the known lever transmission, and the measuring disc can be directly coupled with the displaceable part of the metering device.

A further advantage of the invention resides in that the weight of the device according to the invention is extremely low and that it enables very rapid transferral from liquid to gaseous fuel.

The force pressing the foil against the slit edges can be produced in various ways in embodiments of the invention. For example, this force can be applied by the differential pressure between the inlet and outlet sides of the slits, or the member displaceable along the slits applies the force with which the foil is pressed against the slit edges, in which case it is expedient to have the foil held taut by a spring. In a preferred embodiment of the invention, however, this contact pressure is produced by magnets. In this case, the foil covering the slits in dependence upon the flow of air taken in by the engine consists of a magnetizable material, possibly also of a magnetizable synthetic resin. For this purpose, magnets can be arranged on the slit means in any configuration. However, in an embodiment of the invention, the slits are formed by permanent magnets which are secured at a slight distance from one another and are magnetized transversely in relation to the direction of the slits so that positioned opposite to a north pole at one edge of the slit is a south pole of the other magnet bar at the opposite slit edge.

The aforementioned means producing the force that presses the foil against the walls of the slits can also be realized cumulatively in an embodiment of the invention.

The member counteracting the bearing pressure can, in an embodiment of the invention, be rigidly connected to the member acting in the same direction as the bearing pressure, in which case the foil is guided with its side facing the slits over this member so that on this foil section between the member acting in the direction of the bearing pressure and the member counteracting the bearing pressure, the foil is raised from the slit edges, releases the appropriate portion of the slits for passage of the gas and now only rests with the section between its end secured to the slit means and the member acting in the direction of the bearing pressure on the slit edges.

The member which draws the foil away from the edges of the slits can also take the form of a spring which engages the free end of the foil and is mounted at an incline to the surface of the slit means so that the spring force comprises a component extending vertically to the surface of the slit means. In this case, too, the foil section between its free end and the member acting in the direction of the bearing pressure is raised from the slits, whereas the foil section between the foil end secured to the slit means and the member acting in the direction of the bearing pressure rests on the slit edges and covers the slits along the length corresponding to this section.

In an embodiment of the invention, the metering device is arranged centrically in a housing through which the combustion air taken in by the engine flows, preferably in front of the throttle valve, known per se, controlled by the accelerator pedal. This housing, including the metering device, can be connected directly to the outlet of the air filter.

The metering device is controlled by a measuring device which is positioned in the air stream that is drawn in, and indicates the quantity of air flowing through per unit of time, for which purpose it is expedient for it to comprise a measuring disc in a conical measuring member. In this case, the motion of the measuring disc can be directly transferred to the displacement motion of the member acting in the direction of the bearing pressure, for example, a roller.

Finally, embodiments of the invention may comprise a sensor means which generates an electric signal corresponding to the position of the measuring disc and consequently the quantity of air flowing through per unit of time, in order that this measurement can be indicated or other devices in the motor vehicle can be controlled by this electric signal in dependence upon the quantity of combustion air drawn in.

The metering device according to the invention is not only suitable for internal combustion engines, particularly motor vehicles which can be driven alternatively with liquid fuel or gaseous fuel, but also for other apparatus in which gaseous fuel must be metered in dependence upon another flowing medium. Use of the invention is also not limited to such propellant gases as are stored in the liquid, undercooled state and transported, but also possible for metering gaseous fuels in stationary equipment which is operated, for example, on natural gas.

Two embodiments of the metering device according to the invention are shown in the drawings.

Figure 1:
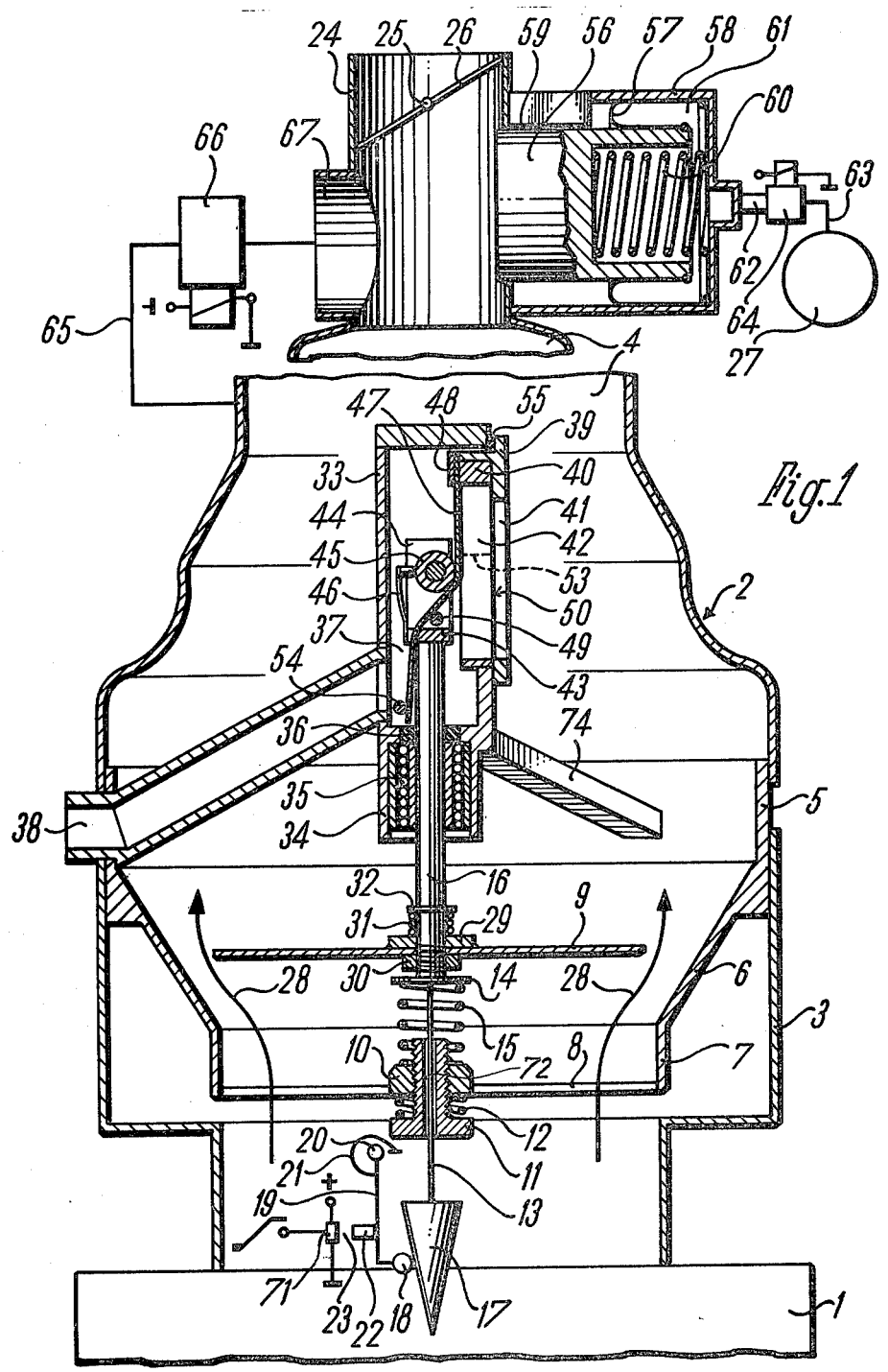
FIG. 1 is a cross-sectional view of a metering device according to the invention located between the air filter 1 and the throttle valve of an internal combustion engine, wherein the upper part of the device is broken off and illustrated on a smaller scale and some details are shown only schematically.

In the embodiment shown, the metering device according to the invention is positioned in front of a constant pressure carburetor. A housing 2 comprised of two sections 3 and 4 joined to one another by an annular insert 5 is connected to the outlet nozzle of an air filter 1. Connected to the cylindrical part of the insert 5, in a downward direction, as shown in FIG. 1, is a conical member with a circular cylindrical section 7 at its lower end. Secured to the lower end of section 7 is a bar 8 which extends across the lower opening of section 7. Together with section 7 the conical member 6 forms a measuring nozzle with a measuring disc 9 suspended therein. For this purpose, there is secured to the bar 8 a nut 10 with a stop screw 11 inserted therein in counteraction to the force of a pressure screw spring 12. The screw 11 comprises a longitudinal bore 72 with a measuring pin 13 guided therein supporting at its upper end in FIG. 1 a disc 14 which is urged upwardly by a pressure screw spring 15 against the lower end of a measuring rod 16. The other end of the spring 15 is supported at the stationary bar 8 through the nut 10. The spring 15 is only strong enough to partially balance the weight of the parts supported at the disc 14 in the vertical position shown in FIG. 1.

Secured to the lower end of the measuring pin 13 is a measuring cone 17 with a roller 18 abutting its outer surface. The roller is secured to one end of an arm 19 whose other end is pivotally mounted at an axis 20, with a flat spiral spring 21 retaining the arm 19 and consequently the roller 18 adjacent the measuring cone 17. To simplify the general outlay, parts 18, 19 and 20 are only illustrated schematically in the drawings.

As shown schematically, there is secured to the arm 19 a permanent magnet 22, opposite which a magnetically controllable sensor 71 is located in a stationary position. The latter may take the form of a sound probe. A movement of the measuring probe 13 in axial direction is transformed by the measuring cone and the pivotal motion of the arm 19 into a change in the size of an air gap 23 between the magnet 22 and the sensor 71. An electric signal corresponding to the size of the air gap is generated at the output end of the sensor 71. This arrangement therefore permits transferral of the longitudinal movement of the measuring pin 13 into an analog electric signal.

Connected to the upper end of the housing section 4 is a housing 24 with the throttle valve 26 of a conventional constant pressure carburetor mounted at its throttle valve shaft 25. The upper end of the housing 24 is connected to the intake pipe 27 of the engine shown only schematically in FIG. 1. The engine therefore takes in the intake air along the arrows 28 through the annular gap between the measuring disc 9 and the inside wall of the conical measuring member 6 into housing 2 and from there through the funnel 24. The measuring disc 9 is more or less raised by the amount of air which passes through this air gap and corresponds to the engine load, and the rising of the measuring disc 9 is a direct measure of the amount of air flowing in direction 28.

For adjustment on the measuring rod 16, the measuring disc 9 is slidably guided in a bushing 29 at its axis. The adjustment is made using a nut 30 screwed onto a thread at the lower end of the measuring rod 16 in counteraction to the force of a pressure screw spring 31 whose one end is supported at a retaining ring 32 and whose other end is supported at the bushing 29.

Centrically in the upper section 4 of the housing 2, a housing 33 is secured by props 74 to the housing insert 5. In the lower section 34 of the housing 33 a ball sleeve 35 is inserted with the measuring rod 16 mounted therein for longitudinal displacement. Connected to the upper end of the ball guide sleeve 35 is a seal 36 which seals off the inside area 37 of the housing 33 in a downward direction. The interior 37 is connected by a gas supply line 38 to a preheating station, not illustrated, where the liquefied gas mixture, which may, for example, consist of propane and butane and is previously expanded, is heated to a temperature of 5° C. The inside area 37 of the housing 33 is separated from the interior of the housing 2 by a slit means 40 in a cover 39. The cover 39 comprises one or several recesses 41, in the region of which the slit means 40 is provided with one or several slits 42 through which the propellant gas supplied to the inside area 37 in amounts controlled by a metering device comprising a roller slide means flows into the interior of the housing 2.

The metering device comprises a fork-shaped bearing block 43 secured to the upper end of the measuring rod 16, and a cylindrical roller 45 is mounted for rotation on roller bearings between its two legs 44. The bearing of the roller 45 is transversely displaceable by a small degree with respect to the longitudinal axis of the measuring rod 16. The free end of a leaf spring 46 presses against the bearings of the roller 45. A foil 47 is secured at its upper end, as shown in FIG. 1, by a clamping strip 48 to the cover 39 which in the embodiment shown simultaneously constitutes the slit means 40. The foil extends beyond the slits 42 of the slit means 40 through the gap between the roller 45 and the slit means 40 and over a roller pin 49 secured in the bearing block 43 at a distance from the surface of the slit means 40 so that after passing through the gap between the roller 45 and the slit means 40 the foil is guided away from the latter's surface. In the embodiment shown, the lower end of the foil 47 is held by a bar 54.

Figure 2:
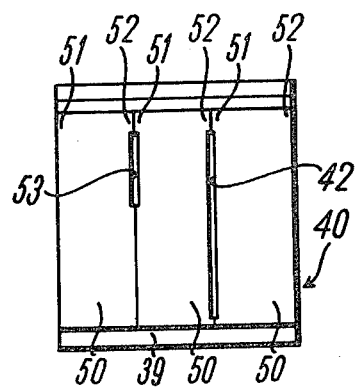
FIG. 2 is a top view of the slit means on a larger scale.

The slit means 40 comprises bars 50 as permanent magnet whose poles, as shown in FIG. 2, are located at their longitudinal edges. They are arranged in the slit means 40 such that a north pole 52 of the adjacent rod is opposite a south pole 51. The bars 50 are directly secured to the cover 39, for example, by adhesion. When being attached, non-adhesively coated steel foils whose thickness determines the width of the slits 42, which, in turn, depends on the amount of gas to be controlled, are inserted between the magnet bars 50. After the adhesive has hardened, the steel foils are removed so that a gap of defined length and defined width remains between the pole surfaces of the bars 50. The foil 47 consists of magnetizable material, for example, a suitable steel or magnetizable synthetic resin. It is pressed tightly against the slit edges by the magnets. The rising of the measuring rod 16 causes the foil to be withdrawn by the roller pin 49 from the slit edges by a precisely defined amount which is determined by the distance between the pin 49 and the roller 45, and during the downward motion the roller 45 again brings the foil to rest against the slit edges in the defined manner. The amount of gas flowing through the slits is thereby controlled in dependence upon the position of the measuring disc 9 in the conical measuring means 6 and consequently in dependence upon the amount of air flowing through the conical measuring means.

In embodiments of the invention, two magnetic bars 50 can form a single slit 42. In other embodiments three bars 50 are provided and these then form two slits 42 between them. One of the two slits, for example, a slit 54, may be shorter than the slit 42 so that this one is only released when higher engine power is required and the gas/air mixture should have a higher proportion of gas. The two slits 42 and 53 together form a register whose flow cross-section is additionally increased when the slit 53 is opened. The area of the section between the bars 50 adjacent the slit 53, by which amount this slit is shorter than the slit 42, is closed by steel foils.

The width of the slits 42, 53 can increase or decrease in the longitudinal direction of the slits so that the gas proportion of the mixture can be adapted optimally to the motor load, for example, in the case of higher engine speed the total cross-section of the slits is changed unproportionally. Slots with stepped edges can also be used instead of slits with V-shaped open clearance.

The exact length of the section of the slits which is released is determined by the contact line between the roller 45 against the surface of the bars 50. Since the foil is necessarily raised by the roller pin 49 and the distance between the latter and the roller 45 remains constant, the pressure of the gas supplied through the line 38 has, in practice, no decisive influence on the rising of the foil 47 from the edges of the slits 42 and 53.

The gas passing through the slits 42 and 54 enters the inside area of the housing 2 through the recess 41. The cover 39 is secured to the housing 33 by a seal 55.

Since the inside area of the housing 33 is also sealed off at the place where the measuring rod 16 enters it by a seal 36, the gas pressure forming in the housing 33 acts on the cross-sectional area of the measuring rod 16 and presses it in a downward direction. If there is no air flowing in the direction of the arrows 28, the measuring disc 9 is located in its lowest position. Once there is a flow in the direction of the arrows 28 the measuring disc 9 is raised in accordance with the amount of air flowing through. If the measuring nozzle 6 is provided with an appropriate conical shape, a certain curve of the dependence of the rising of the measuring rod 16 on the amount of air flowing through can be predetermined. In an embodiment of the invention, wherein the spring 15 was given certain dimensions, and a gas pressure of 0.5 bar existed in the housing 33, with a pressure fluctuation in the gas of ±0.1 bar, the flow of gas through the slits 42, 53 controlled by the foil 47, changed by only ±3%, and the position of the measuring disc 9 also only changed by this percentage. Thus, pressure fluctuations in the gas in front of the metering device only have a minimal effect on the amount of gas entering the housing 2.

A conventional constant pressure carburetor for liquid fuels is connected to the housing 24. A slide piston 56 actuates the needle of a jet, not illustrated, in a known carburetor, to meter the amount of liquid fuel, and it is controlled by a control bore in the carburetor housing if liquid fuel is used. Thus, the pressure pertaining to the fuel mixture when it enters the carburetor also exists in front of the throttle valve 26.

The slide 56 is sealed off from the housing 58 connected to the throttle valve housing 24 by a roller membrane 57. It is guided by a guide means 59 and a pressure spring 60 ensures that in idle the piston 56 almost fully closes the cross-section of the housing 24 in front of the throttle valve 26.

Upon occurrence of a vacuum in the area 61 behind the piston 56, the piston 56 is pushed into the position shown in FIG. 1 against the force of the spring 60. This vacuum in the area 61 is created by a pipe connection 62, 63 with the engine intake pipe 27 shown only schematically and comprising a 2/2 way acting valve 64. When the engine is running on liquefied gas the solenoid valve 64 is switched to open so that during the entire speed and load range the full vacuum of the intake pipe 27 rests against the slide 56 and therefore the slide is in its drawn back position shown in FIG. 1 so that the clear cross-section of the housing 24 in front of the throttle valve 26 is practically fully available for the gas/air mixture from the housing 2.

To enable a further increase in the passage cross-section in front of the throttle valve 26, embodiments of the invention can comprise an additional pipe line 65 connected to the housing 2. As simply indicated by a line in FIG. 1, the pipe line extends via a 2/2 way acting valve 66 into a pipe socket 67 which is connected to the housing 24 immediately in front of the throttle valve 26.

Figure 3:
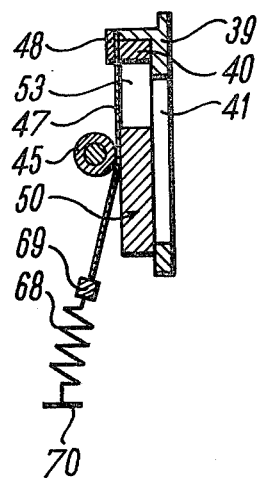
FIG. 3 is a cross-sectional view of another embodiment of the roller slide according to the invention.
Figure 4:
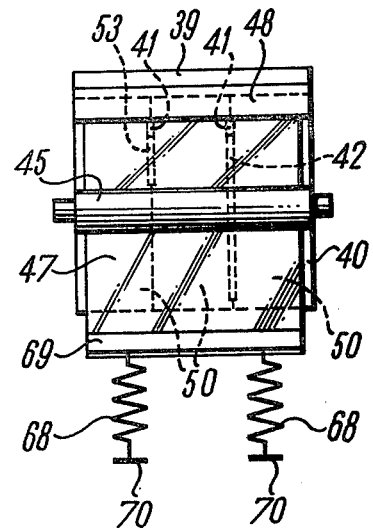
FIG. 4 is a top view of the embodiment shown in FIG. 3.

FIGS. 3 and 4 illustrate an embodiment of the invention wherein the foil 47 is not withdrawn from the edges of the slits 42 and 53 by a roller pin 49 but by two springs 68 which engage a strip 69 attached to the lower end of the foil 47 and act in a parallel direction. The rear end of the springs 68 is secured to points 70 in the housing 33 which are spaced from the plane formed by the surface of the slit means 40 facing the foil. The force of the springs 68 therefore causes the foil 47 to move at an incline to the surface of the slit means 40 on the foil section extending between the roller 45 and the lower end of the foil 47. In the area of this section the slit 42 is then released for passage of the gas.

In other embodiments of the invention, the pressure with which the foil 47 is urged against the edges of the slits 42, 53 may also simply be constituted by the differential pressure between the gas pressure inside the housing 33 and the pressure in the housing 2 so that causing the foil 47 to engage by magnetic effect is no longer necessary. In the embodiment shown in FIGS. 3 and 4 there is also no necessity for the foil 47 to be pressed against the slit edges if the springs 68 hold the foil 47 sufficiently tightly and the roller 45 presses the foil 47 closely against the slit edges. This embodiment functions independently of how large a differential pressure exists between the gas in the housing 33 and the mixture in the housing 2.

If magnetic forces are not required to press the foil 47 against the slit edges, the foil 47 can then, of course, consist of a non-magnetizable material.

I claim:

1. A metering device for gaseous propellant for an internal combustion engine comprising in combination:
    a slit carrier through which the gaseous propellant flows,
    means for covering at least one slit of said slit carrier in dependence upon flow of another medium,
    said means comprising a foil being held under pressure of determined direction against edges of said slit, and further being rigidly secured at a first end adjacent one end of said slit to said slit carrier,
    a first member which counteracts said pressure and engages a second end of said foil which is located adjacent a second end of said slit; and
    a second member which acts in said determined direction of said pressure, and causes said foil to bear against said edges and is further displaceable along said slit in dependence upon said flow of said other medium.

2. A device according to claim 1 wherein said second end of said foil is engaged by at least one spring whose force exerted on said foil has a force component which raises a portion of said foil between said second end and said second member away from said edges.

3. A device according to claim 1 wherein said first member is rigidly connected to said second member, and said foil rests with its side facing said slit on said first member.

4. A device according to claim 1 wherein said foil is pressed against said edges by a differential pressure between an inlet and an outlet side of said slit.

5. A device according to claim 1 wherein said second member is pressed against said foil with said pressure, and said foil is held taut by a spring.

6. A device according to claim 1 wherein said second member comprises a roller mounted for rotation.

7. A device according to claim 1 wherein said first member comprises a roller mounted for rotation.

8. A device according to claim 1 wherein several slits of varying lengths are arranged in said slit carrier.

9. A device according to claim 1 wherein said slit is of varying width along its length.

10. A device according to claim 1 wherein said second member is pressed by a spring against said foil and a surface of said slit carrier.

11. A device according to claim 1 wherein said second member is mounted for rotation in a bracket which is displaceable along said slit and is secured to a measuring rod which is directly connected to a measuring device for said other medium.

12. A device according to claim 1 wherein said slit carrier is inserted in a wall of a sealed-off housing which is mounted in a housing through which said other medium flows, with an interior of said housing being connected to a supply line of said gaseous propellant.

13. A device according to claim 1 wherein conical measuring means with a measuring disc of determined position is arranged in a path of flow of said other medium, and said slit is opened in dependence upon said position of said measuring disc.

14. A device according to claim 1 wherein said foil consists of a magnetizable material, and said slit carrier comprises magnets which attract said foil.

15. A device according to claim 14 wherein said slit carrier comprises magnetic poles delimiting said slit.

16. A device according to claim 14 wherein said magnets are permanent magnets.

17. A device according to claim 14, wherein said slit is formed between transversely magnetized permanent magnet bars.

18. A device according to claim 1 positioned in an axis of a housing through which said air taken in by said internal combustion engine flows.

19. A device according to claim 18 wherein said housing is arranged in front of a throttle valve, being positioned in an intake pipe of said internal combustion engine.

20. A device according to claim 19 located in an air stream between an air filter and said throttle valve, a carburetor for liquid fuel being positioned parallel thereto.

* * * * *

UNITED STATES PATENT AND TRADEMARK OFFICE
CERTIFICATE OF CORRECTION

PATENT NO. : 4,465,052
DATED : August 14, 1984
INVENTOR(S) : Erich Alois Dolderer It is certified that error appears in the above-identified patent and that said Letters Patent is hereby corrected as shown below:

Column 2, line 43, "than" should read --then--.
Column 6, line 17, "54" should read --53--.
Column 6, line 40, "54" should read --53--.

Signed and Sealed this

Twelfth Day of February 1985

[SEAL]

Attest:

DONALD J. QUIGG

Attesting Officer        Acting Commissioner of Patents and Trademarks